(12) United States Patent
Fong

(10) Patent No.: US 10,422,528 B2
(45) Date of Patent: Sep. 24, 2019

(54) METHOD OF CAPTURING SINTERED PRODUCT AFTER SINTERING WASTE GAS IN SEMICONDUCTOR MANUFACTURING PROCESS

(71) Applicant: ORIENT SERVICE CO., LTD., Taipei (TW)

(72) Inventor: Wu-Yu Fong, Taipei (TW)

(73) Assignee: ORIENT SERVICE CO., LTD., Taipei (TW)

( * ) Notice: Subject to any disclaimer, the term of this patent is extended or adjusted under 35 U.S.C. 154(b) by 287 days.

(21) Appl. No.: 15/271,174

(22) Filed: Sep. 20, 2016

(65) Prior Publication Data
US 2018/0017254 A1    Jan. 18, 2018

(30) Foreign Application Priority Data
Jul. 18, 2016  (TW) .............................. 105122615 A

(51) Int. Cl.
| | | |
|---|---|---|
| *B01D 53/46* | (2006.01) | |
| *B01D 53/64* | (2006.01) | |
| *B01D 53/68* | (2006.01) | |
| *B01D 53/76* | (2006.01) | |
| *F23J 15/08* | (2006.01) | |
| *F23J 15/00* | (2006.01) | |
| *F23J 15/04* | (2006.01) | |

(52) U.S. Cl.
CPC .............. *F23J 15/08* (2013.01); *B01D 53/46* (2013.01); *B01D 53/64* (2013.01); *B01D 53/68* (2013.01); *B01D 53/76* (2013.01); *F23J 15/006* (2013.01); *F23J 15/04* (2013.01); *B01D 2252/103* (2013.01); *B01D 2257/2027* (2013.01); *B01D 2257/55* (2013.01); *B01D 2257/60* (2013.01); *B01D 2257/93* (2013.01); *B01D 2258/0216* (2013.01); *Y02C 20/30* (2013.01)

(58) Field of Classification Search
None
See application file for complete search history.

(56) References Cited

U.S. PATENT DOCUMENTS

| | | | | |
|---|---|---|---|---|
| 6,423,284 B1 * | 7/2002 | Arno | ...................... | B01D 53/68 |
| | | | | 423/240 R |
| 7,695,700 B2 * | 4/2010 | Holst | ..................... | B01D 47/06 |
| | | | | 423/210 |
| 7,972,582 B2 * | 7/2011 | Shinohara | .......... | B01D 53/1456 |
| | | | | 423/240 R |

* cited by examiner

*Primary Examiner* — Colleen P Dunn
(74) *Attorney, Agent, or Firm* — Chun-Ming Shih

(57) ABSTRACT

The invention relates to a method of capturing a sintered product after sintering a waste gas in a semiconductor manufacturing process and its capturing device. The method comprises providing aerosolized water molecules to be entered into a reaction chamber of a waste gas treatment tank; and capturing a product generated after a sintering reaction of the waste gas by diffusion distributing of the aerosolized water molecules, wherein, the aerosolized water molecules are diffusion distributed between a bottom edge of a waste gas reaction end in the reaction chamber and a tank wall surrounding the reaction chamber. The present invention further provides a device for capturing a sintered product for implementing the method. The object of the present invention is to solve problems saying that a semiconductor exhaust gas is processed by a high temperature sintering treatment, the generated $SiO_2$ powders, the $WO_2$ powders or the $BO_2$ powders are extremely fine, the $F_2$ gas is small molecules, and it is not easy to capture them during a rear stage water washing program.

3 Claims, 5 Drawing Sheets

(A-A)

METHOD OF CAPTURING SINTERED PRODUCT AFTER SINTERING WASTE GAS IN SEMICONDUCTOR MANUFACTURING PROCESS

TECHNICAL FIELD

The present invention relates to a method of capturing a sintered product after sintering a waste gas in a semiconductor manufacturing process, especially to one which captures a sintering reaction product after sintering a waste gas in a semiconductor manufacturing process, and to a waste gas product capturing device for applying the method.

BACKGROUND OF THE INVENTION

It is known that an exhaust gas generated in a semiconductor manufacturing process contains $SiH_4$, $H_2SiCl_2$ (DCS), $WF_6$, $BF_3$, $NF_3$, $F_2$, etc., wherein the harmful fluorides (PerFluorinated Compounds, PFC), such as, $NF_3$ and $F_2$, are discharged to the atmosphere, they cause environmental pollution, even the greenhouse effect. Most seriously, it results in a serious impact on global warming, and it is necessary to process the exhaust gases to convert them into harmless gases or products.

The widely used semiconductor waste gas treatment equipment is used for converting or processing the exhaust gas into a harmless gas or product. In general, the well-known semiconductor processing equipment are equipped with an exhaust gas reaction chamber into which the exhaust gas generated in the semiconductor manufacturing process is input and is sintered (i.e. the sintering reaction) in the reaction chamber by using a high temperature flame or a high temperature provided by a hot rod. In particular by means of high temperature sintering reaction, the harmful fluoride gases, such as, $NF_3$ and $F_2$, and other fluoride gases are decomposed into harmless fluoride ions so as to achieve the purpose of purifying the exhaust gas.

It is known that after the high-temperature sintering process, $SiO_2$ powders, $WO_2$ powders, and $BO_2$ powders and $F_2$ gas product will be generated in the reaction chamber. The product is usually subject to rear stage washing program (scrubber) when it is captured and scrubbed in order to be filtered and screened after the above-mentioned product can be deposited in water.

Since in the resultant products, the $SiO_2$ powders, the $WO_2$ powders, and the $BO_2$ powders are extremely fine, and $F_2$ gas small molecules are tiny, the exhaust gas washing program used in the known semiconductor processing equipment cannot be used to sufficiently capture the products by its water column or water droplets. Thus, a purification efficiency of the exhaust gas in the semiconductor manufacturing process is poor, and the costs of the purification of exhaust gas in the treatment equipment and process are increased. Therefore the process is needed to be improved.

SUMMARY

In view of this, the main object of the present invention is to solve problems saying that a semiconductor exhaust gas is processed by a high temperature sintering treatment, the generated $SiO_2$ powders, the $WO_2$ powders or the $BO_2$ powders are extremely fine, the $F_2$ gas is small molecules, and it is not easy to capture them during a rear stage water washing program.

In order to achieve the above object and solve the problems, the present invention provides a method of capturing a sintered product after sintering a waste gas in a semiconductor manufacturing process, comprising the steps of:
providing aerosolised water molecules to be entered into a reaction chamber of a waste gas treatment tank; and
capturing a product generated after a sintering reaction of the waste gas by diffusion distributing of the aerosolised water molecules,
wherein, the aerosolised water molecules are diffusion distributed between a bottom edge of a waste gas reaction end in the reaction chamber and a tank wall surrounding the reaction chamber.

According to the above method, in a specific embodiment of the present invention preferably the waste gas is carried out the sintering reaction by contacting with a flame, and the waste gas reaction end is a flame vent.

According to the present invention, preferably the waste gas is carried out the sintering reaction by contacting with a hot rod, and the waste gas reaction end is a circumference of the hot rod.

According to the present invention, a water wall is preferably formed around a tank wall of the reaction chamber, and the aerosolised water molecules are diffusion distributed between a bottom edge of a waste gas reaction end and the water wall.

According to the present invention, the aerosolised water molecules are preferably supplied to the bottom edge of the waste gas reaction end via a plurality of water columns spaced apart at a circumferential distance.

According to the present invention, a nozzle is preferably formed at each terminal of the plurality of water columns, and regarding the bottom edge of the waste gas reaction end it is a gap formed between the nozzle and the waste gas reaction end.

According to the present invention, preferably the product comprises a $SiO_2$ powder, a $WO_2$ powder, a $BO_2$ powder and a $F_2$ gas.

According to the present invention, the present invention further provides a device for capturing a sintered product according to the method, comprising:
a cover disposed at a top of a reaction chamber formed on a waste gas treatment tank;
a waste gas introducing pipe and a heater respectively disposed in the reaction chamber, a waste gas reaction end being formed at the heater in the reaction chamber corresponding to an outlet of the waste gas introducing pipe;
a ring-shaped water disk disposed between the cover and the waste gas treatment tank, an inlet pipe located outside of the reaction chamber being formed on the ring-shaped water disk; and
a plurality of nozzles spaced apart at a circumferential distance distributed in the reaction chamber,
wherein the plurality of nozzles are disposed between the waste gas reaction end and a tank wall around the reaction chamber.

According to the above device, in a further embodiment of the present invention, preferably the waste gas introducing pipe and the heater are respectively disposed on the cover and inserted into the reaction chamber.

According to the present invention, preferably the heater is a flame heater for forming a flame vent at the waste gas reaction end to provide a flame for sintering the waste gas from the waste gas introducing pipe.

According to the present invention, preferably the heater is a hot rod for sintering the waste gas from the waste gas introducing pipe at the waste gas reaction end.

According to the present invention, preferably a water wall is formed around a tank wall of the reaction chamber, and the aerosolised water molecules are diffusion distributed between a bottom edge of a waste gas reaction end and the water wall.

According to the present invention, preferably a water driver is fluidly connected to the inlet pipe of the ring-shaped water disk, and the water driver comprises an aerosol generator of water molecules.

According to the present invention, preferably a plurality of water columns protruding from ring-shaped water disk and spaced apart at a circumferential distance, the plurality of nozzles are formed at bottom of the water columns and regarding the bottom edge of the waste gas reaction end it is a gap formed between the nozzle and the waste gas reaction end.

According to the present invention, preferably a water passage for fluidly connecting between the inlet pipe and the plurality of nozzles of the water columns is formed in the ring-shaped water disk.

According to the present invention, preferably the product comprises a $SiO_2$ powder, a $WO_2$ powder, a $BO_2$ powder and a $F_2$ gas.

According to the above-described method and device, technical effects of the present invention are that collision of the aerosolised water molecules with the $SiO_2$ powders, the $WO_2$ powders, the $BO_2$ powders results in very tiny particles. The use of aerosolised water molecules will result in acceleration of the $F_2$ gas to be dissolved in high dissolution rate in water in order to facilitate subsequent stage washing program to capture and to scrub.

Furthermore, please refer to the following examples and drawings to demonstrate the embodiments of the invention in details.

BRIEF DESCRIPTION

DETAILED DESCRIPTION OF THE INVENTION

Figure 1:
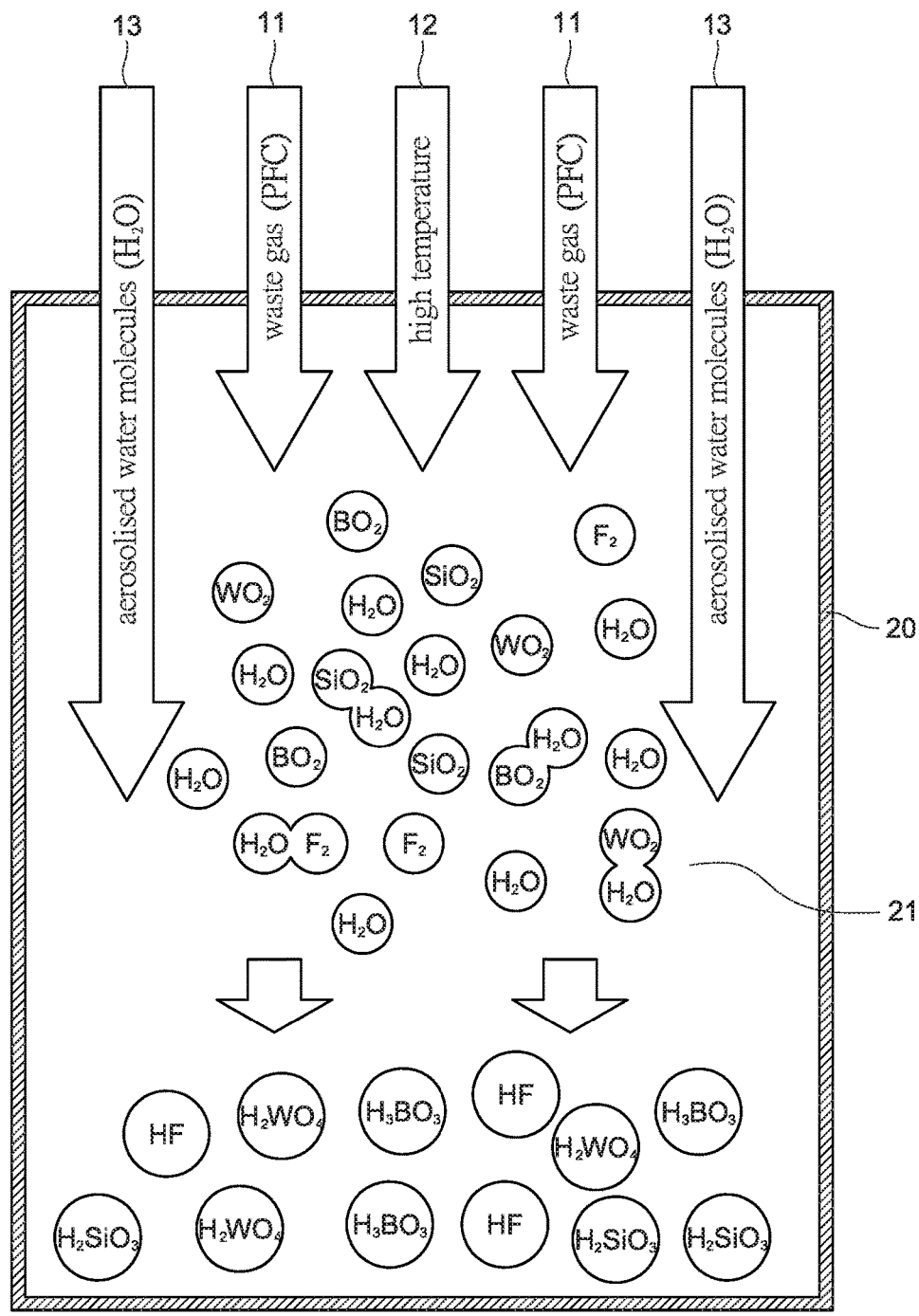
FIG. 1 is a schematic diagram illustrating the method of the present invention to capture.

Please refer to FIG. 1 which discloses a schematic diagram of a method of capturing a sintered product after sintering a waste gas in a semiconductor manufacturing process provided in the first embodiment of the present invention described in a semiconductor process apparatus having a waste gas treatment tank 20. A reaction chamber 21 at a front side is formed in the waste gas treatment tank 20. The waste gas 11 generated from a semiconductor manufacturing process is guided to move into the reaction chamber 21 at a front side. The waste gas 11 is processed by sintering using a high temperature 12 from a flame or a hot rod at a waste gas reaction end of the reaction chamber 21. After the waste gas 11 is processed by sintering using the high temperature 12, the reaction products, such as, the $SiO_2$ powders, the $WO_2$ powders, the $BO_2$ powders or the $F_2$ gas, are generated in the reaction chamber 21. When the waste gas 11 contacts with the flame to be processed by sintering reaction, the waste gas reaction end 26 means flame vents. When the waste gas is in contact with the hot rod to carry out the sintering reaction, the waste gas reaction end 26 means space around the hot rod.

In the present invention, the aerosolised water molecules 13 enter into the reaction chamber 21 of the waste gas treatment tank 20 so that the aerosolised water molecules 13 are diffusion distributed between the bottom edge of the waste gas reaction end in the reaction chamber 21 and the tank wall surrounding the reaction chamber 21 so as to capture the sintered products after the sintering reaction of the waste gas 11. Furthermore, a gap between the waste gas reaction end and its bottom edge should be maintained so that the aerosolised water molecules 13 run away from the waste gas reaction end in order to avoid the aerosolised water molecules to reduce the temperature of the waste gas reaction end, thereby affecting the sintering effect of the waste gas 11.

From the foregoing, the products containing the $SiO_2$ powders, the $WO_2$ powders, the $BO_2$ powders and the $F_2$ gas are generated in the high temperature sintering process. The following chemical equations (1) to (4) are respectively disclosed to be the ones when the products which are the $SiO_2$ powders, the $WO_2$ powders, the $BO_2$ powders and the $F_2$ gas react with the aerosolised water molecules 13.

The following chemical equation (1) is disclosed to be one when the reaction product is $SiO_2$:

$$SiO_2 + H_2O \dashrightarrow H_2SiO_3 \qquad \text{chemical equation (1)}$$

The following chemical equation (2) is disclosed to be one when the reaction product is $WO_3$:

$$WO_3 + H_2O \dashrightarrow H_2WO_4 \qquad \text{chemical equation (2)}$$

The following chemical equation (3) is disclosed to be one when the reaction product of $B_2O_3$:

$$B_2O_3 + 3H_2O \dashrightarrow 2H_3BO_3 \qquad \text{chemical equation (3)}$$

The following chemical equation (4) is disclosed to be one when the reaction product of $F_2$:

$$2F_2 + 2H_2O \dashrightarrow 4HF + O_2 \qquad \text{chemical equation (4)}$$

In the preferred embodiment, because the aerosolised water molecules 13 are tiny and are distributed in the form of diffusion in the reaction chamber 21 so as to effectively capture the products, such as, the $SiO_2$ powders, the $WO_2$ powders, the $BO_2$ powders and the $F_2$ gas. In addition to the use of aerosolized water molecules 13 to collide with the $SiO_2$ powders, the $WO_2$ powders or the $BO_2$ powders and to become larger to make them subtle, the use of aerosolised water molecules 13 can accelerate the dissolution rate of the $F_2$ gas to be dissolved in water in order to facilitate the rear stage washing and scrubbing of the capturing program. Thus the generated non-toxic gases are discharged to the outside (the waste gas treatment tank of the rear stage washing process, it is not a non-appeal or improvement issue of the present invention, and it will not recited repeatedly herewith).

Figure 2:
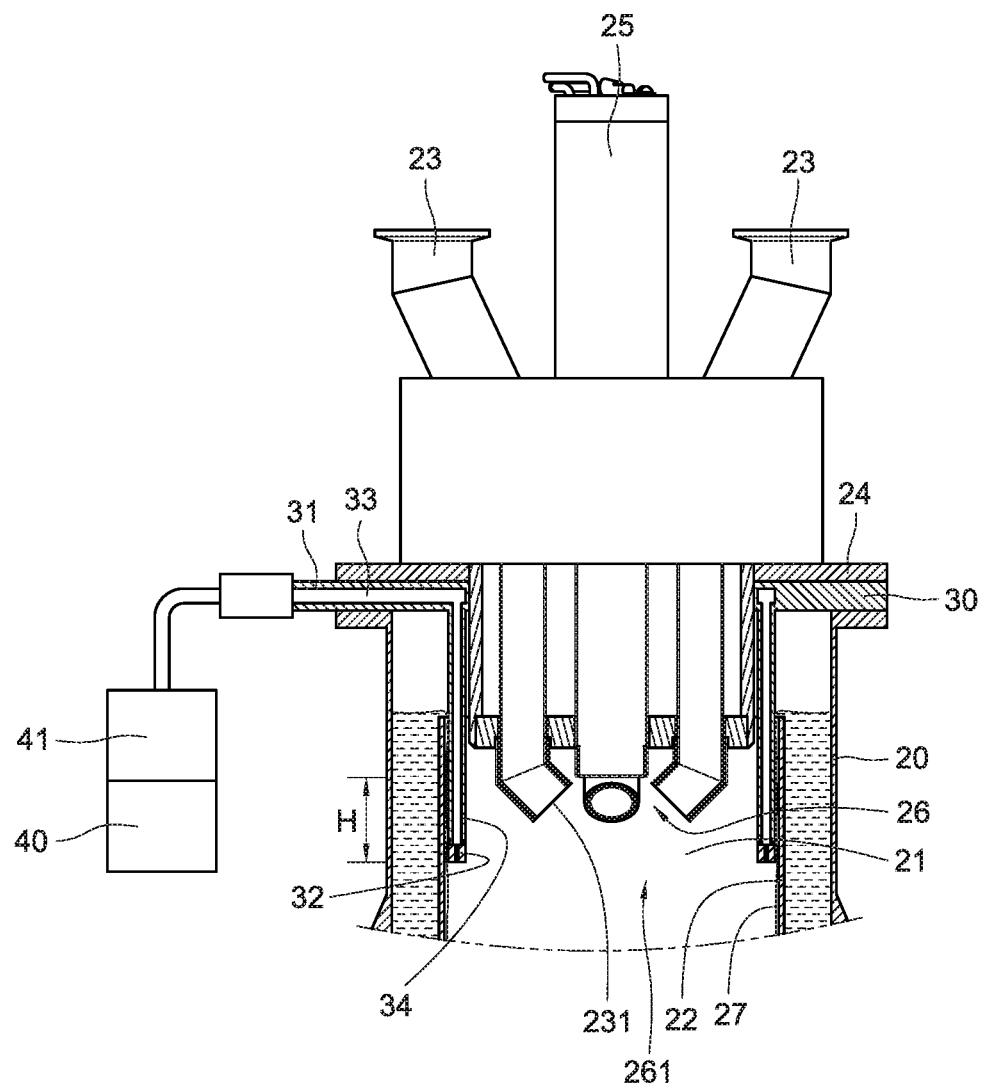
FIG. 2 is a structural diagram of the capturing device of the present invention.
Figure 3:
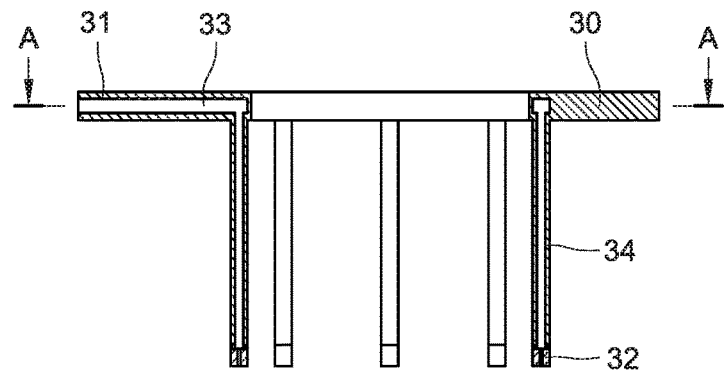
FIG. 3 is a cross-sectional view of a water disk of the capturing device of the present invention.
Figure 4:
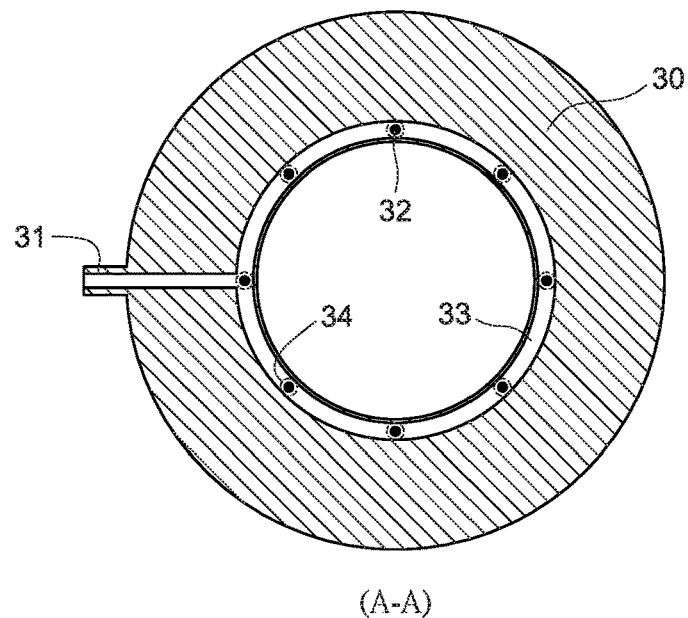
FIG. 4 is a cross-sectional view along a line A-A of the FIG. 3 of the present invention.

In order to implement the method, please refer to the FIGS. 2 to 4 which disclose a second preferable embodiment of the present invention providing the implementation details of a device for capturing a sintered product. FIG. 2 discloses a configuration diagram of the capturing device of the present invention. FIG. 3 discloses a cross-sectional diagram of the water disk 30. FIG. 4 discloses another cross-sectional view of the water disk 30.

In the implementation of the embodiment, an introducing pipe 23 of the semiconductor manufacturing process waste gas 11 is disposed. An outlet 231 is formed at the introducing pipe 23 of the reaction chamber 21. The introducing pipe 23 is fluidly connected to the reaction chamber 21 of the front stage processing via the outlet 231. The semiconductor manufacturing process waste gas 11 is guided and moved into the reaction chamber 21 by the introducing pipe 23. In more details, a cover 24 is disposed at a top of the waste gas treatment tank 20. The introducing pipe 23 is mounted on the cover 24. The waste gas 11 is guided and moved into the reaction chamber 21 from the top of the waste gas treatment tank 20 by the introducing pipe 23.

A heater 25 implanted in the reaction chamber 21 is disposed in the waste gas treatment tank 20. In implementation, the heater 25 spaced from and in association with the introducing pipe 23 of the semiconductor manufacturing process waste gas 11 is mounted on the cover 24. Moreover, the outlet 231 of the introduction pipe 23 is directed toward the position of the heater 25. The area where the waste gas 11 injected from the introducing pipe 23 contacts with the heater 25 is defined as a waste gas reaction end 26. The waste gas 11 is sintered by using a high temperature provided by the heater 25 at the waste gas reaction end 26 so as to produce the products, such as, the $SiO_2$ powders, the $WO_2$ powders, the $BO_2$ powders and the $F_2$ gas. In real implementation, the heater 25 may be a flame heater. A flame vent of the flame heater is the so-called waste gas reaction end 26. Alternatively the heater 25 may be a hot rod. The thing surrounding the hot rod is the waste gas reaction end 26.

An annular water disk 30 is disposed between the cover 24 and the waste gas treatment tank 20. An inlet pipe 31 located outside of the reaction chamber 21 is formed at the annular water disk 30. A plurality of nozzles 32 surrounding and annularly spaced apart in the reaction chamber 21 are formed. A plurality of water passages 33 located in the annular water disk 30 are formed for fluidly connecting between the inlet pipe 31 and the nozzles 32 so that the aerosolised water molecules 13 can move from the inlet pipe 31 to the water passages 33 and can be sprayed in the reaction chamber 21.

In specific embodiments, a plurality of water columns 34 protruding from ring-shaped water disk 30 and spaced apart at a circumferential distance, the plurality of nozzles 32 are formed at bottom of the water columns. The water passage 33 is fluidly connected to the inlet pipe 31 and the nozzles 32 via the water columns 34. By means of the water columns 34, the nozzles 32 are located at a bottom edge 261 of the waste gas reaction end 26 so that the aerosolised water molecules 13 are diffusion distributed between the bottom edge 261 of the waste gas reaction end 26 and the tank wall 22 around the reaction chamber 21. Regarding the bottom edge 261 of the waste gas reaction end 26 it is a gap H formed between the nozzle 32 and the waste gas reaction end 26. The gap H is used for moving the aerosolised water molecules 13 away from the waste gas reaction end 26 so that the aerosolised water molecules 13 sprayed from the nozzle 32 can avoid to reduce the temperature of the waste gas reaction end 26, thereby affecting the effect of sintering the waste gas 11.

Please refer to FIG. 2 illustrating a water wall 27 is formed around the tank wall 22 of the reaction chamber 21. The barrier of the water wall 27 can preventing the products, such as, the $SiO_2$ powders, the $WO_2$ powders, the $BO_2$ powders and the $F_2$ gas, generated after the high temperature sintering process in the reaction chamber 21 from adherence to the tank wall 22 around the reaction chamber 21. The aerosolised water molecules 13 are diffusion distributed between the bottom edge 261 of the waste gas reaction end 26 and the water wall 27.

Please refer to FIG. 2 illustrating at the annular water disc 30 of the inlet pipe 31 a water driver 40 is externally connected. The water driver 40 comprises an aerosol generator 41 which can mix the water from the water driver 40 with the air to form the aerosolised water molecules 13. Then, the aerosolised water molecules 13 are injected into the reaction chamber 21 via the inlet pipe 31.

Figure 5:
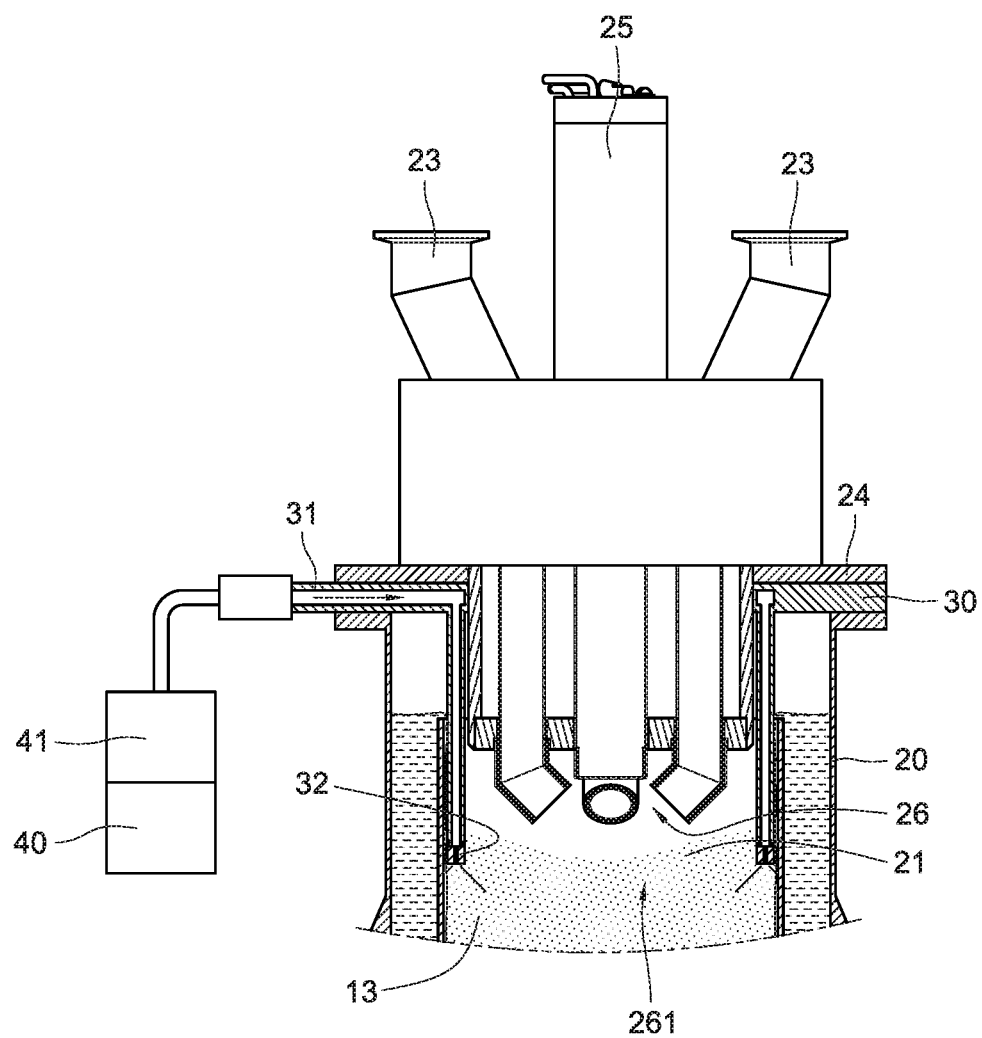
FIG. 5 is a schematic diagram of the operation of the capturing device of the FIG. 2.
Figure 6:
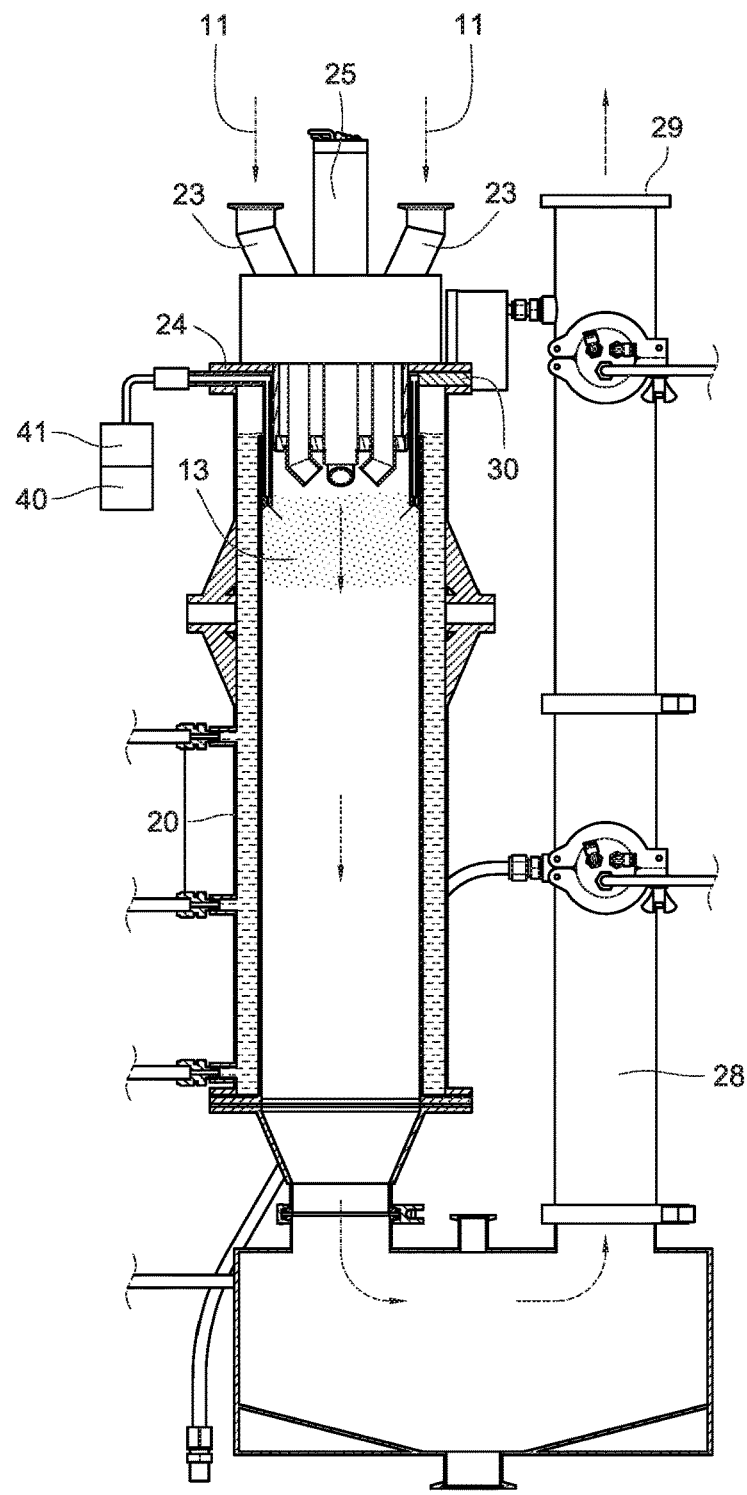
FIG. 6 is a cross-sectional diagram showing a configuration of the capturing device mounted on the semiconductor exhaust gas treatment tank.

Please refer to FIGS. 5 and 6 illustrating that the waste gas 11 moves into the reaction chamber 21 at the front stage of waste gas treatment tank 20. By using the high temperature provided by the heater 25, the waste gas 11 is sintered to react at the waste gas reaction end 26 of the heater 25 so that the products, such as, the $SiO_2$ powders, the $WO_2$ powders, the $BO_2$ powders and the $F_2$ gas, are generated after the high temperature sintering process in the reaction chamber 21. When an air flow in the reaction chamber 21 pushes the products to move to the bottom edge 261 of the waste gas reaction end 26, the products collide with the aerosolised water molecules 13 sprayed from the nozzle 32. Thus, the $SiO_2$ powders, the $WO_2$ powders and the $BO_2$ powders combined with the aerosolised water molecules 13 to make their tiny particle become smaller and to accelerate the dissolution rate of $F_2$ gas dissolved in water by using the aerosolised water molecules 13 for facilitating the rear stage washing program to capture and scrub. The component 28 is a washing tower and the component 29 is an exhaust orifice.

Although the present invention has been explained in relation to its preferred embodiment, it is to be understood that any other possible modifications and variations can be made without departing from the scope of the invention as hereinafter claimed.

I claim:

1. A method of capturing a sintered product after sintering a waste gas in a semiconductor manufacturing process, comprising the steps of:
   mixing water with air at room temperature to form a gaseous aerosolized water;
   introducing the gaseous aerosolised water into a reaction chamber of a waste gas treatment tank from a plurality of water columns, wherein the plurality of water columns are disposed inside the reaction chamber, and nozzles of the plurality of the water columns are positioned between a waste gas reaction end and a bottom end of the reaction chamber; and
   capturing the sintered product generated after a sintering reaction of the waste gas by the gaseous aerosolised water,
   wherein, the gaseous aerosolised water are diffusely distributed in an area defined by the nozzles of the plurality of water columns, the bottom end of the reaction chamber, and a tank wall surrounding the reaction chamber;
   wherein granularities of molecules of the gaseous aerosolised water are less than the granularity of the sintered product; and
   wherein the sintered product collides with the molecules of the aerosolised water for heat exchange, so as to accelerate dissolution rate of the sintered product in water, as well as enlarging the granularity of the sintered product.

2. The method of capturing a sintered product after sintering a waste gas in a semiconductor manufacturing process as claimed in claim 1, wherein the plurality of water columns are spaced apart at equal circumferential distance.

3. The method of capturing a sintered product after sintering a waste gas in a semiconductor manufacturing process as claimed in claim 2, wherein the product comprises a $SiO_2$ powder, a $WO_2$ powder, a $BO_2$ powder and a $F_2$ gas.

* * * * *